April 4, 1939.  J. K. RINGIUS  2,153,026
DUST COLLECTOR
Filed Sept. 4, 1937

INVENTOR.
JOHN K. RINGIUS
BY  J. A. Bried
ATTORNEY.

Patented Apr. 4, 1939

2,153,026

UNITED STATES PATENT OFFICE 2,153,026

DUST COLLECTOR

John K. Ringius, San Francisco, Calif.

Application September 4, 1937, Serial No. 162,499

6 Claims. (Cl. 183—85)

The invention relates to the so-called cyclone dust collectors or centrifugal dust collectors or separators of the type where the dust laden air or gas is forced in a stream into a cylindrical or conical receptacle in a manner to spin the air at a high velocity and whereby the dust particles are thrown outward by centrifugal force against the walls of the receptacle to settle and pass downward while the clarified air passes out upwardly through a central tube or vent.

The principal object of the invention is to provide improvements in the construction of such dust collectors which will tend to keep the separated powder spinning at the lower end of the cone and also force it downwardly so as to insure a more complete separation of the suspended particles and overcome the tendency of the separated powder to again mix with the air stream and join the outflowing or discharge air.

Another object is to accomplish the above automatically. Another object is to recycle a controlled amount of dust laden air.

Other features and advantages of the invention will appear in the following description and accompanying drawing.

Figure 2:
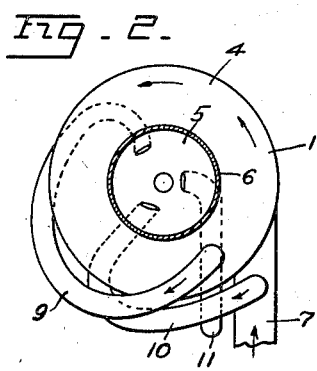
Figure 2 is a cross section of Figure 1 taken along the line 2—2 thereof.

In further detail, in all the figures the vertically disposed cylindrical body of the dust collecting chamber is designated 1. It is generally made of sheet metal and with its lower portion 2 of conical form or tapered downwardly to a relatively small discharge pipe 3.

The upper end 4 is closed except for a central opening 5 from which extends downwardly as a central tube or so-called "tubular" 6 which terminates at about the upper end of the conical portion 2 and is open at its lower end.

The air laden dust is forced at high speed from a blower (not shown) into the upper portion of the chamber from a pipe 7 which enters the chamber tangentially as best shown in Figure 2.

So far the description applies to the common form of centrifugal dust collector, and without further construction will generally satisfactorily separate the heavier particles in dust laden air forced into it by way of its tangential inlet pipe 7 by the blower. The particles thrown outwardly by centrifugal force against the side walls of the chamber around the circular baffle tube 6 will spin around the walls in a spiral manner and slide down and concentrate in the discharge pipe 3 while the surplus air will pass out through tube 6, it being usual to provide an elevated roof 8 over the chambers when located outside of buildings to prevent rain falling into tube 6.

When very light or fine dust is carried by the incoming air stream to be separated it frequently happens that much of the finer material passes out of tube 6 with the discharge air, and in order to overcome this objection, resort is had to the use of various artifices in order to remove these finer particles.

I have discovered that one of the principal causes for the imperfect separation and consequent passing of considerable dust with the discharged air out of the vent 5, is that the spinning motion of the dust layer against the conical wall of the collector gradually becomes less and less as it nears the discharge pipe 3, and consequently it tends to mix with the rising central column of air to pass out of the tubular vent 6.

Prior attempts, as shown by Patent Nos. 1,856,685 and 2,074,818, have attempted to reduce the dust losses by arranging an open-ended pipe adjacent the lower zone of the collector and exposing its upper end in a manner with reference to the incoming air at the upper end of the collector so as to set up a slight suction in the pipe and thereby draw upward some of the dust laden air and reinject it into the separator. Such attempts, however, have generally failed with finely suspended dust, first because very little suction can be induced into the pipe, and second, since the very same air together with the new incoming air speedily returns and there is a well defined limit to the capacity of the separator shell the same quantity of air that comes in must all go out of the vent, and if some is taken from the lower part of the cone, more must go out in place of it.

After considerable experimenting with various arrangements of centrifugal dust collectors, I discovered that if the spinning effect of the dust layer could be increased toward the lower part of the cone and the layer at the same time urged downward, the dust losses would be considerably reduced.

I also found that the zone at the upper end of the collector is, during operation, under greater internal pressure than the lower part where the dust freed air is escaping freely to atmosphere, and especially is this so at a point adjacent the tangentially arranged inlet pipe, where the air after once sweeping around the upper part of the collector again meets the incoming stream and has to divert downwardly.

I also found that this pressure could be beneficially used to inject at points around the lower part of the cone to speed up the spiral motion of the dust layer at that point and urge it downwardly as well, and also that the available pressure from the upper part of the cone could be augmented by the use of an auxiliary blower, and further, that in some cases it is desirable to also draw some of the fine dust-laden air from the central lower area and re-inject it into the collector, either by power, or by the slight suction mentioned, or use it to help spin the lower column of dust as explained.

Various modifications of the above idea are shown in the drawing as will now be more particularly described.

Figure 1:
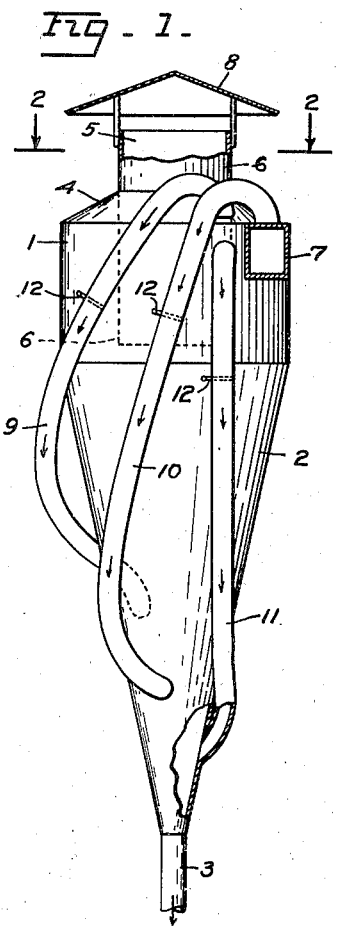
Figure 1 is an elevation of a conical centrifugal dust collecting chamber fitted with my special piping arrangement to carry out one form of the invention.

In Figure 1 air is taken from the top of the collector under pressure by pipes 9, 10 and 11 and directed downwardly and injected into the lower portion of the cone in an angular manner at successively lower positions spaced around the cone to follow up the spiral motion of the dust layer to increase its spinning speed and at the same time urge it downwardly to thereby greatly overcome its tendency to again mix in considerable amounts with the air and join the exhaust.

In Figure 1 it will be noted that pipe 9 is at a point on top of the collector just before the entrance of dust laden air from inlet pipe 7. This is the point of greatest pressure. Pipe 11 takes off on the side just under pipe 9, and pipe 10 takes off from the top of inlet pipe 7. All three pipes are preferably fitted with dampers 12 to regulate their relative flows.

It will be evident from a consideration of Fgures 1 and 2 that the pressures developed in pipes 9, 10 and 11 will depend on the form and arrangement of their receiving openings at their upper ends, for if their receiving openings are directed toward the spinning air or toward the air being introduced from inlet pipe 7, the air will be forced directly into them and down to the lower part of the cone, but this would also carry too much dust through the pipes as well as large particles which might tend to disrupt the separated dust layer at the lower part of the cone, and I therefore prefer to take the pipes off in the manner shown.

Figure 4:
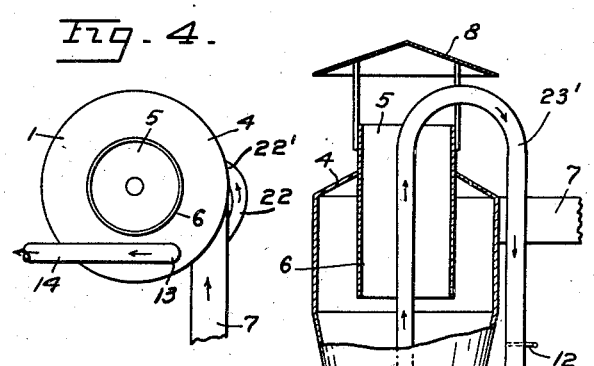
Figure 4 is a plan view of Figure 3.
Figure 3:
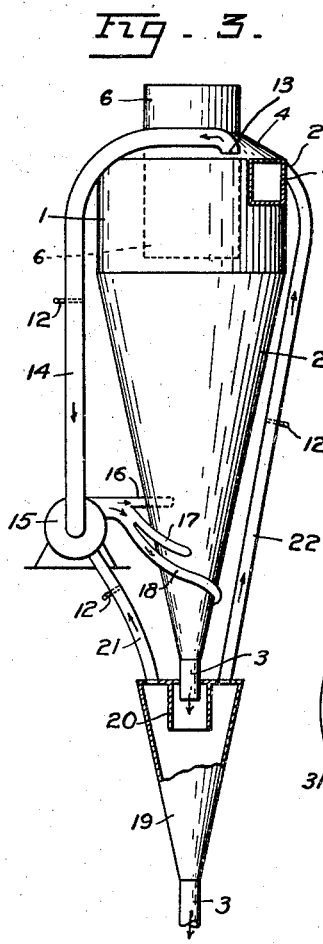
Figure 3 is a view similar to that of Figure 1, but showing a modification of the structure including the use of a blower and a dust receiving bin.

The arrangement shown in Figures 3 and 4 varies from that of Figures 1 and 2 in taking off the air at one point only at the top of the collector at 13 adjacent the inlet pipe 7 and passing it through a pipe 14 to a power blower 15 from which it is forced through three branch pipes 16, 17, 18 spirally into the lower part of the cone as explained for Figure 1.

In Figure 3 is also shown a dust receiving bin 19 with a baffle at 20 and a suction pipe 21 leading from the left of the baffle to join pipe 14 at the inlet of the blower 15. This provides for carrying a little more of the fine dust laden air back into the cone to aid that from pipe 14 in forcing the layer down and maintaining its spin. Dampers 12 in the pipes provide for adjusting any desired flow in either pipe depending on the nature of the dust and the result produced.

In the arrangement of Figure 3 I preferably also provide a pipe 22 leading from the right or other side of baffle 20 back up to the top of the separator casing 1 to enter at 22' into the incoming air stream from pipe 7. This pipe is also fitted with a damper as it is only used in some cases where an extra amount of suspended dust and pressure gathers in bin 19.

Figure 5:
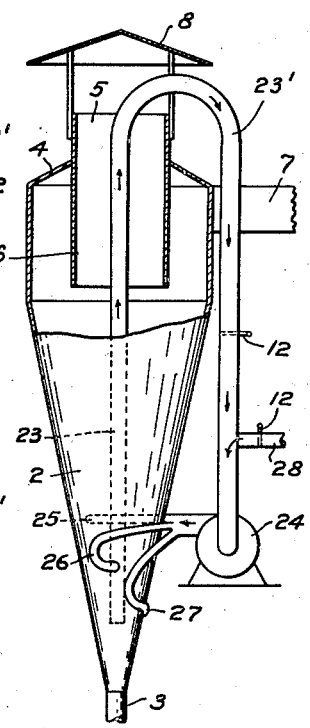
Figure 5 is an elevation of a cyclone dust collector partly in section, showing a modified arrangement of the piping of the invention.

In Figure 5 a variation of the idea is shown where a central pipe 23 is extended axially of the cone from a point near its lower end, through its vent pipe 6 to return downward as at 23' to a power blower 24 from which it is forced through three branch pipes 25, 26, 27 spirally into the lower part of the cone as described for Figure 1. A branch inlet pipe for outside air, or dust laden air from any source is provided for blower 24 at 28 and both pipes 28 and 23' are suitably provided with dampers or volume controlling gates as at 12.

Figure 6:
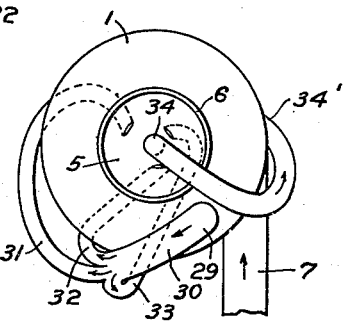
Figure 6 is a plan view similar to that of Figure 2 but showing a further modification.

Figure 6 is a plan view of an arrangement similar to that of Figure 1, except that the air for spiral injection into the lower part of the cone is taken from the highest point of pressure on top of the casing 1 at 29 by pipe 30 only and split into three branches 31, 32, 33 for spiral injection into the lower part of the cone as described for Figure 1. In this showing I also show a central suction pipe 34 extending from the lower zone of the cone (corresponding to pipe 23 of Figure 5) but instead of passing it into a blower as in Figure 5, it is returned to the casing 1 at a point 34' in the incoming air stream from pipe 7 in a manner to set up an inspirating or suction action in pipe 34 as described for pipe 22 of Figure 3. Also, as stated for the other figures, all pipes are to be suitably provided with dampers to control relative flow of air or shut off when operating with materials not requiring the effects of the special piping.

Having thus described my improved construction in a centrifugal or cyclone type of dust collector, and some of its modifications, it will be seen to offer a complete control of the flow and counter flow, speed up movement of the dust layer, etc. as not before had in this class of apparatus.

I therefore claim:

1. In a cyclone type of dust collector, a dust receiving bin at the lower end thereof substantially closed on top, a blower, a pipe leading air from the upper part of the collector to said blower, and a pipe from said blower directing the air into the lower zone of the cone.

2. In a cyclone type of dust collector, a dust receiving bin at the lower end thereof substantially closed on top, a blower, a pipe leading air from the upper part of the collector to said blower, and a plurality of pipes from said blower directing the air into the lower zone of the cone at spaced points thereabout.

3. In a cyclone type of dust collector, a dust receiving bin at the lower end thereof closed on top, a blower, a pipe leading air from the upper part of the collector to said blower, and a pipe from said blower directing the air into the lower zone of the cone, and a pipe leading air from said bin to the intake of said blower.

4. In a cyclone type of dust collector, a dust receiving bin at the lower end thereof closed on top, a blower, a pipe leading air from the upper part of the collector to said blower, and a pipe from said blower directing the air into the lower zone of the cone, and a pipe leading air from said bin to the intake of said blower, another pipe leading air from said bin to the upper part of said collector at a point with relation to its entering air stream to cause a suction in the last mentioned pipe.

5. In a centrifugal dust collector having a vertically arranged substantially conical imperforate walled single chamber with its smaller end extending downwardly and provided with an outlet at said end for passing out of the separated dust, a tangentially arranged inlet adjacent the upper end of the chamber for injecting dust laden gas under pressure into the chamber for spiralling about and settling toward said outlet, and a centrally disposed tubular exhaust gas outlet opening out of the top of the chamber projecting a distance down into the same, the improvement which comprises providing additional means for injecting gas under pressure taken from a position close to said inlet substantially out of the spiral path of the moving gas, to the lower portion of the cone in a downward tangential manner tending to urge the separated powders along in their spiral direction of movement and downward.

6. In a centrifugal dust collector having a vertically arranged substantially conical imperforate walled single chamber with its smaller end extending downwardly and provided with an outlet at said end for passing out of the separated dust, a tangentially arranged inlet adjacent the upper end of the chamber for injecting dust laden gas under pressure into the chamber for spiralling about and settling toward said outlet, and a centrally disposed tubular exhaust gas outlet opening out of the top of the chamber projecting a distance down into the same, the improvement which comprises providing additional means for injecting gas under pressure at successively lower points spaced around the lower portion of the cone in a downward tangential manner tending to urge the separated powders along in their spiral direction of movement and downward.

JOHN K. RINGIUS.